United States Patent [19]

Barber

[11] 4,007,015
[45] Feb. 8, 1977

[54] APPARATUS USEFUL FOR THE PRODUCTION OF HYDROGEN

[75] Inventor: Everett M. Barber, Wappingers Falls, N.Y.

[73] Assignee: Texaco Inc., New York, N.Y.

[22] Filed: Dec. 17, 1975

[21] Appl. No.: 641,854

Related U.S. Application Data

[62] Division of Ser. No. 532,338, Dec. 13, 1974.

[52] U.S. Cl. .................................. 23/281; 23/262; 23/277 R; 23/284; 165/8; 423/415 A; 423/655

[51] Int. Cl.² ...................... B01J 7/00; C01B 1/02; C01B 31/18

[58] Field of Search ................ 23/281, 277 R, 262, 23/284; 48/197 R, 202, 211, 73 US, 99 US, 102, 103; 165/6, 8, 10, 86

[56] References Cited

UNITED STATES PATENTS

| | | | |
|---|---|---|---|
| 2,657,124 | 10/1953 | Gaucher | 48/197 R |
| 2,681,273 | 6/1954 | Odell | 48/202 X |
| 2,782,109 | 2/1957 | Roberts | 48/73 X |
| 2,823,243 | 2/1958 | Robinson | 23/284 X |
| 3,174,834 | 3/1965 | Edwards et al. | 23/284 |
| 3,592,610 | 7/1971 | Freiday et al. | 23/277 R X |

Primary Examiner—Joseph Scovronek
Attorney, Agent, or Firm—T. H. Whaley; C. G. Ries; Robert Knox, Jr.

[57] ABSTRACT

Hydrogen is produced by the combustion of carbon with air to produce a combustion gas effluent containing carbon dioxide and nitrogen. The carbon dioxide is separated and reacted with carbon to produce carbon monoxide. The resulting produced carbon monoxide is then reacted with steam to produce carbon dioxide and hydrogen and the resulting produced hydrogen separated. The carbon utilized for the production of hydrogen may be obtained by the thermal decomposition of hydrocarbons to yield carbon and gaseous hydrogen or the carbon utilized in this process may be obtained from a solid carbonaceous fuel, such as coal or coke or the like. A reactor useful for the thermal decomposition of a hydrocarbonaceous fuel to produce gaseous hydrogen and carbon and particularly adaptable for use in the process in accordance with this invention comprises a reactor provided with a high temperature thermal decomposition zone and means therein for effecting the separation between any solid ash constituents of the fuel, the resulting produced carbon and the resulting produced gaseous hydrogen.

1 Claim, 5 Drawing Figures

APPARATUS USEFUL FOR THE PRODUCTION OF HYDROGEN

This is a division of application Ser. No. 532,338, filed Dec. 13, 1974.

This invention relates to a process and apparatus useful for the production of hydrogen.

It is known to produce hydrogen commercially and on a large scale from hydrocarbons and hydrocarbonaceous material. One such known process involves the partial oxidation of hydrocarbons. This process, however, requires a source of oxygen usually obtained by the cryogenic fractionation of liquefied air. Another process involves the steam reforming of hydrocarbons. This process, however, requires special hydrocarbon feedstocks, such as the normally gaseous hydrocarbons, e.g., methane, or light naphthas, all of which are in short supply and which are more usefully employed for other purposes.

It is an object of this invention to provide a process and apparatus useful therein for the production of hydrogen from usually readily available materials, such as heavy residual petroleum fractions, or similar hydrocarbonaceous materials, carbon, coke, coal and carbonaceous materials.

It is another object of this invention to provide a process and apparatus useful therein for the production of hydrogen from hydrocarbonaceous or carbonaceous materials and which does not require a source of oxygen other than air.

Still another object of this invention is to provide a process and apparatus useful therein for the production of hydrogen from relatively low grade, usually readily available and inexpensive materials and for the use of the hydrogen thus produced for the production of ammonia or for use in petroleum refining operations, such as hydrotreating, or in chemical plant operations, such as hydrogenation.

In at least one embodiment of the practices of this invention, at least one of the foregoing objects will be achieved. How these and other objects of this invention are achieved will become apparent in the light of the accompanying disclosure made with reference to the accompanying drawings wherein:

In accordance with this invention, hydrogen is produced by a sequence of operations involving the following chemical reactions:

$$C + O_2 \text{ (air)} \rightarrow CO_2 \qquad 1.$$

$$C + CO_2 \rightarrow 2 CO \qquad 2.$$

$$CO + H_2O \rightarrow CO_2 + H_2 \qquad 3.$$

More specifically, in accordance with the practices of this invention carbon, such as may be obtainable by the thermal decomposition of a heavy fuel oil, or coal, is combusted or burned with air or with oxygen-enriched air, if desired and/or available, to produce carbon dioxide. The resulting produced carbon dioxide is recovered and reacted at a high temperature with carbon to produce carbon monoxide. The resulting produced carbon monoxide is then recovered and reacted in a so-called shift converter with steam to produce hydrogen and carbon dioxide. The hydrogen is recovered as the desired product and the carbon dioxide can be recovered and, if desired, recycled in the process for reaction with additional carbon.

The separate reactions upon which the overall process of this invention is based are well known. For example, it is well known to pyrolyze or thermally decompose hydrocarbonaceous material, such as a heavy or residual petroleum fraction, by subjecting the same to high temperature, such as by contact with a high temperature refractory particulate material, e.g., in a pebble heater, or to thermally decompose heavy hydrocarbons in a coking operation, such as a delayed coking operation as conventionally carried out in a petroleum refinery. It is also known to combust or burn carbon with air or oxygen-enriched air to produce a combustion gas effluent comprising substantially only carbon dioxide and nitrogen.

It is also known to react carbon dioxide and carbon to produce carbon monoxide. The reaction between carbon dioxide and carbon to produce carbon monoxide is described by Rhead and Wheeler in Trans. Chem. Soc. 97–2178 (1910) and 99–1140 (1911) and by Clement in the Univ. Ill. Eng. Sta. Bul. No. 30, see also Marks Mechanical Engr's Handbook, 6th Ed. 4–77 through 4–81, and by Clement and Adams, U.S. Bureau of Mines, Bul. No. 7, see also Kent's Mechanical Engineers Handbook, 10 Ed., pages 1204–1206.

According to Rhead and Wheeler, the reaction of carbon dioxide and carbon to yield carbon monoxide in experiments with carbon dioxide and carbon in equilibrium at different temperatures and pressures, gave the following data for atmospheric pressure:

| Temperature ° F | % $CO_2$ | % CO |
| --- | --- | --- |
| 1562 | 6.23 | 93.77 |
| 1652 | 2.22 | 97.78 |
| 1742 | 1.32 | 98.68 |
| 1832 | 0.59 | 99.41 |
| 2192 | 0.06 | 99.94 |

Additionally, Clement on the basis of observations of reactions carried out in coal fires reported that a temperature of 2372° F. is necessary to transform about 90% of $CO_2$ into CO. On the other hand, Clement and Adams report, based on flowing $CO_2$ through a coke bed, both the temperature and the flow rate (residence time) have an effect on the conversion of $CO_2$ to CO. Based on Clement and Adams, graphs of flow rate versus % conversion suggest that the reaction may be considered instantaneous at or slightly above 2000° F. In any event, the reaction between carbon dioxide and carbon to produce carbon monoxide is the high temperature endothermic reaction and higher temperatures, particularly temperatures above 1500° F., especially above about 1750° F. and 2000° F., are desirable in order to obtain substantially complete conversion of carbon dioxide to carbon monoxide by reaction with carbon.

The shift conversion operation involving the reaction between carbon monoxide and steam to produce hydrogen and carbon dioxide is a well known conventional operation.

Figure 1:
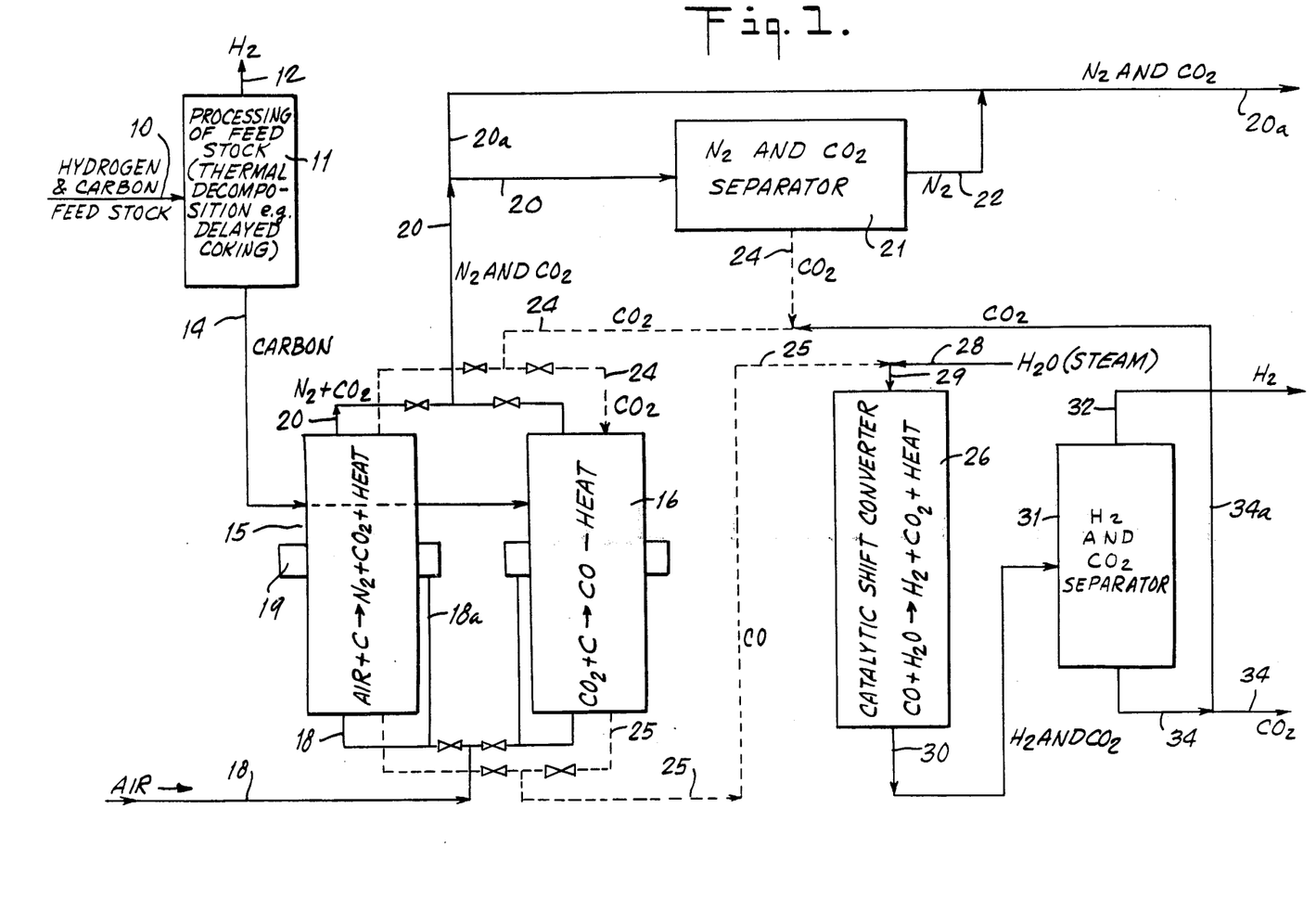
FIG. 1 schematically illustrates a flow scheme in accordance with the practices of this invention for the conversion of a hydrocarbonaceous feedstock into hydrogen.

Reference is now made to FIG. 1 of the drawings which schematically illustrates a flow scheme in accordance with this invention employing a hydrocarbonaceous feedstock for the ultimate production of hydrogen therefrom. As illustrated in FIG. 1, a hydrogen and carbon-containing feedstock, i.e., hydrocarbonaceous feedstock, such as a heavy hydrocarbon residual fraction, is supplied via conduit 10 to thermal decomposition zone 11 which may be a coker or high temperature pebble heater or reactor wherein the hydrocarbonaceous feed supplied thereto is thermally decomposed or pyrolyzed into substantially two streams, one stream comprising gas oil, gasoline, gas and hydrogen and some entrained solid carbon which exits thermal decomposition zone 11 via line 12 and another stream comprising the remaining carbon or petroleum coke which exits thermal decomposition zone 11 via line 14. The stream exiting via line 12 and containing cracked hydrocarbons and hydrogen is usefully treated, such as by fractionation, to recover specific values therefrom, such as gas oil, gasoline and hydrogen.

The carbon exiting thermal decomposition zone 11 via line 14 is supplied separately to reactors 15 and 16 to form a mass or bed of carbon therein. In reactor 15, the mass or bed of carbon therein is combusted with air supplied via conduits 18 and 18a, shown as solid lines. The air entering reactor 15 via conduit 18a is distributed therein at above about the upper level of the mass or bed of carbon via distributor 19. Within reactor 15, the air combusts or burns the carbon therein to produce a hot gaseous combustion effluent comprising substantially only nitrogen and carbon dioxide. The reaction occurring within reactor 15 is an exothermic reaction.

The resulting gaseous combustion effluent is recovered from reactor 15 via conduit 20 shown as a solid line and supplied to fractionator 21 for the separation of nitrogen and carbon dioxide. The resulting separated nitrogen is recovered via conduit 22, for ultimate use, such as for example, for admixture with the combustion effluent which might, if desired, bypass fractionator 21 via line 20a or for reaction with hydrogen to produce ammonia.

The carbon supplied to reactor 16 via line 14 forms a bed therein and is reacted with carbon dioxide supplied to reactor 16 from fractionator 21 via conduit 24, shown in dashed line. Within reactor 16, the carbon dioxide reacts at a high temperature endothermically to produce carbon monoxide which is recovered from reactor 16 via conduit 25, also shown in dashed lines, for introduction into shift converter reactor 26 together with steam supplied via conduit 28, the carbon monoxide and steam entering shift converter reactor 26 via conduit 29. Within reactor 26, the carbon monoxide and steam are exothermically reacted to produce hydrogen and carbon dioxide which exit reactor 26 via conduit 30 and are supplied to fractionator 31 for separation. Gaseous hydrogen exits fractionator 31 via line 32 and carbon dioxide exits fractionator 31 via conduit 34. If desired, a portion of the carbon dioxide exiting fractionator 31 via conduit 34 may be recycled via conduit 34a to the process with the carbon dioxide supplied to reactor 16 via line 24.

As indicated in FIG. 1, the reactions carried out substantially simultaneously involve thermal decomposition or pyrolysis of hydrocarbonaceous material to produce a gaseous hydrogen-containing stream and a stream of carbon, the combustion of carbon with air to produce a combustion gas effluent comprising nitrogen and carbon dioxide, the reaction of gaseous carbon dioxide with carbon to produce gaseous carbon monoxide and the shift conversion or reaction of gaseous carbon monoxide with steam to produce hydrogen and carbon dioxide. Further, as illustrated in FIG. 1, reactors 15 and 16 can be alternated or reversed, for example, after reactor 15 has been employed, as illustrated, for the combustion of carbon with air to produce a combustion gas effluent comprising nitrogen and carbon dioxide, reactor 15 can be employed to effect reaction between carbon dioxide and carbon to produce carbon monoxide. Similarly, reactor 16, after having been employed to carry out the reaction between carbon dioxide and carbon to produce carbon monoxide, can be employed to carry out the combustion of carbon with air to produce a combustion gas effluent comprising nitrogen and carbon dioxide. The shifting of reactors 15 and 16 alternately and in the manner indicated hereinabove is effected by appropriate closing and opening of the valves in the conduits associated with the reactors since, in effect, reactors 15 and 16 are both twin reactors and, as set forth hereinabove, each reactor 15 and 16 is capable of carrying out the combustion of carbon with air to a combustion gas effluent containing carbon dioxide and nitrogen and the reaction of carbon with carbon dioxide to produce carbon monoxide. The operation of reactors 15 and 16 to carry out the overall reactions in accordance with this invention including ash and sulfur removal devices in line 25 would be apparent to those skilled in the art in the light of the disclosures hereinabove in connection with FIG. 1.

Figure 2:
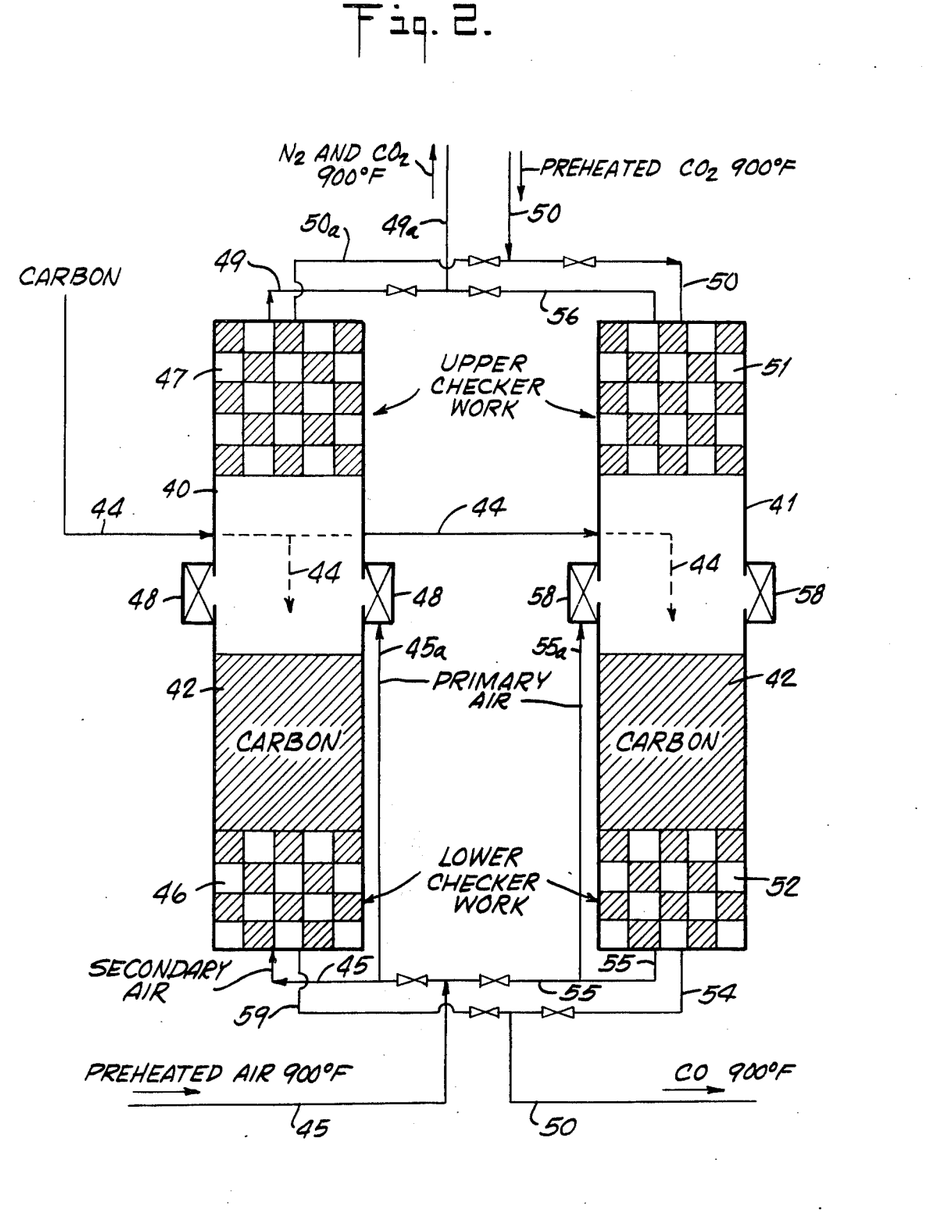
FIG. 2 schematically illustrates apparatus or reactors useful in the practices of this invention for the production of carbon dioxide and for the production of carbon monoxide, utilizing in each reactor a mass of carbon.

Reference is now made to FIG. 2 of the drawings which schematically illustrates an embodiment of the reactors 15 and 16 of FIG. 1 of the drawings. As illustrated in FIG. 2, reactors 40 and 41, equivalent to reactors 15 and 16, respectively, of FIG. 1, are provided with a bed of particle-form carbon 42 therein. In reactor 40, carbon is supplied thereto via conduit 44 and the same conduit serves to supply carbon to reactor 41. Referring specifically to reactor 40 which is illustrated in its phase of operation wherein the bed of carbon 42 is combusted with air, preheated air at a temperature of about 900° F., more or less, is supplied to reactor 40 via conduit 45 into the lower portion of reactor 40 through brick or refractory checker work 46 therein. The air passing through checker work 46 is additionally heated since checker work 46 is at an elevated temperature and upon passing through checker work 46 into contact with bed 42 of carbon, the carbon is combusted to produce a combustion gas effluent comprising nitrogen and carbon dioxide. Additional air for complete combustion of the carbon to carbon dioxide is supplied to reactor 40 via line 45a just above bed 42 of carbon via distributor 48.

The resulting hot combustion gas effluent passes through upper checker work 47 within the upper part of reactor 40 and upon passage therethrough serves to heat the checker work. Thereupon, the combustion gas effluent comprising substantially only nitrogen or carbon dioxide issues from the top of reactor 40 via conduit 49 for further discharge or utilization via line 49a.

While reactor 40 is operated in the carbon combustion phase, reactor 41 is operated in the phase wherein carbon dioxide is endothermally reacted at a high temperature with a bed of particle-form carbon to produce carbon monoxide. In this phase of operation of reactor 41, preheated carbon dioxide, at a temperature of about 900° F., is supplied via conduit 50 into the upper portion of reactor 41 provided with brick or refractory checker work 51 wherein it is further heated before coming into contact with bed 42 of carbon. The carbon dioxide upon passing through bed 42 of carbon reacts therewith to produce carbon monoxide which, after passing through lower checker work 52, issues from reactor 41 via conduit 54 at a temperature of about 900° F. for further utilization in accordance with this invention.

When reactor 41 is operated in the combustion phase, i.e. when bed 42 of carbon therein is combusted with air to produce a hot combustion gas effluent comprising nitrogen and carbon dioxide, preheated air would be introduced into the bottom of reactor 41 via conduit 55 with the resulting combustion gas effluent issuing from the upper part of reactor 41 at a temperature of about 900° F. via conduits 56 and 49a. As illustrated, primary air from conduit 55 would be introduced just above bed 42 of carbon within reactor 41 via conduit 55a and distributor 58. While reactor 41 is thus operated in the combustion phase, reactor 40 would be operated in the phase wherein bed 42 of carbon is endothermically reacted with carbon dioxide to produce carbon monoxide. In this phase of operation of reactor 40 preheated carbon dioxide would be supplied to the upper portion of reactor 40 via conduits 50 and 50a. The preheated carbon dioxide entering the top of reactor 40 passing through hot checker work 47 for additional heating and then into contact with the hot mass or bed 42 of carbon for reaction therewith to produce carbon monoxide which, after passing through lower checker work 46, issues from reactor 40 via conduits 59 and 50 for further utilization in accordance with the practices of this invention.

Figure 3:
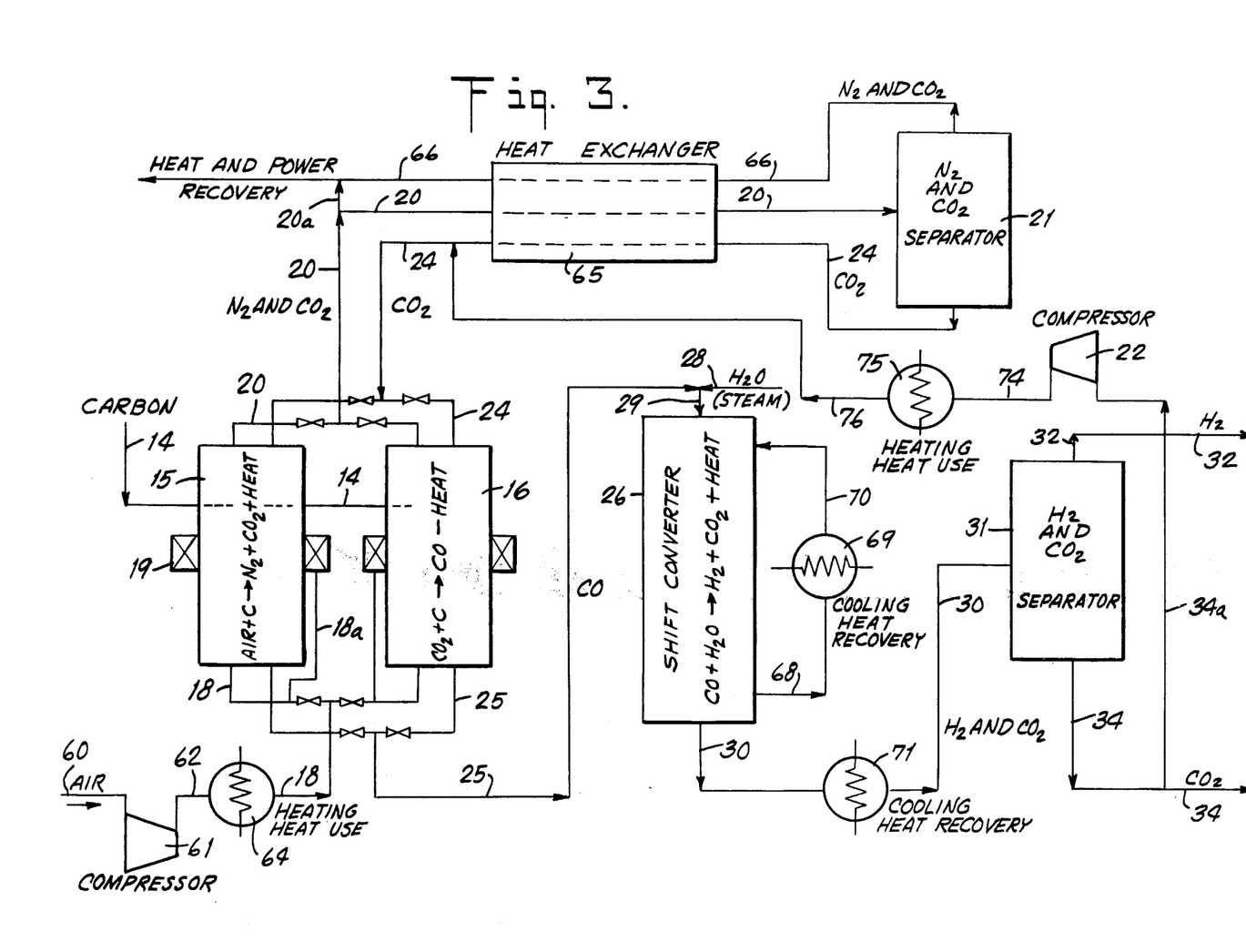
FIG. 3 schematically illustrates a flow scheme of FIG. 1 but also including other apparatus and techniques for the recovery of heat and power from the overall reaction involving the conversion of carbon to hydrogen.

Reference is now made to FIG. 3 of the drawings which shows the embodiment of the invention as schematically illustrated in FIG. 1, as it might be engineered for actual plant installation. In FIG. 3 the same reference numerals have been employed to identify the same components or apparatus.

As illustrated in FIG. 3 particle-form carbon is supplied via line 14 to reactors 15 and 16 to form a bed or mass of carbon therein, respectively. Ambient air via conduit 60 is supplied to and compressed by compressor 61 and the resulting compressed air passed via conduit 62 through heat exchanger 64 wherein the air is heated and then passed via line 18 into lower portion of reactor 15 for combustion of the carbon therein. Additional compressed air, so-called primary air, is also supplied to reactor 15 via line 18a and distributor 19 for distribution within reactor 15 just above the mass of carbon therein so as to complete the combustion of the carbon with the resulting production of a combustion gas effluent comprising substantially only nitrogen and carbon dioxide which is removed from the upper part of reactor 15 via conduit 20. The resulting hot combustion gas in conduit 20 is supplied to heat exchanger 65 for heat exchange therein with other fluids flowing therethrough to be described. The resulting relatively cool combustion gases leaving heat exchanger 65 via line 20 move into fractionator 21 for the separation of nitrogen and carbon dioxide. If desired, instead of passing through heat exchanger 65 the hot combustion gas effluent in conduit 20 may be passed via conduit 20a into a gaseous stream of nitrogen and carbon dioxide issuing from heat exchanger 65 via line 66, as illustrated, for heat and/or power recovery.

While reactor 15 is operated in the phase wherein the bed of carbon therein is combusted with air, reactor 16 is operated in the phase wherein the bed of carbon therein is reacted with carbon dioxide to produce carbon monoxide. When reactor 16 is operating in this phase carbon dioxide supplied from separator 21 via conduit 24 and after heat exchange within heat exchanger 65 enters the upper part of reactor 16 into contact with the hot mass of carbon therein for reaction therewith to produce carbon monoxide which issues from the lower part of reactor 16 via conduit 25.

The resulting produced carbon monoxide passes via conduit 25 and conduit 29 into catalytic shift converter 26 for reaction therein with steam supplied via conduit 28 under conditions such that the carbon monoxide reacts exothermically with the carbon monoxide and steam therein to produce hydrogen and carbon dioxide. As illustrated, temperature control of converter 26 is effected by recycling a stream from the bottom of reactor 26 via line 68 through cooling heat exchanger 69 and conduit 70 for return to the upper part of converter 26.

The resulting produced hydrogen and carbon dioxide issues from the lower part of converter 26 via line 30 and after being cooled by passage through heat exchanger 71, enters separator 31 via conduit 30 for separation of the hydrogen and carbon dioxide. Hydrogen is recovered from the upper part of separator or fractionator 31 via line 32 and the carbon dioxide is recovered from the lower part of separator 31 via line 34. If desired, a portion of the carbon dioxide may be recycled via line 34a through compressor 72, conduit 74, heat exchanger 75 and conduit 76 for return to the process via conduit 24 into reactor 16.

As in connection with FIG. 1 the roles of reactors 15 and 16 can be reversed and indeed regular or cyclical reversal of the roles of reactors 15 and 16 is contemplated in the practices of this invention. Instead of reactor 15 employed in the carbon combustion phase it could be employed in the phase wherein the carbon is reacted with carbon dioxide to produce carbon monoxide and reactor 16 at the same time can be operated at a phase wherein the carbon therein is combusted with air to produce carbon dioxide and nitrogen, all by manipulation of the valves indicated in FIG. 3 and/or in FIG. 1, as will be apparent to those skilled in the art in the light of this disclosure.

Figure 4:
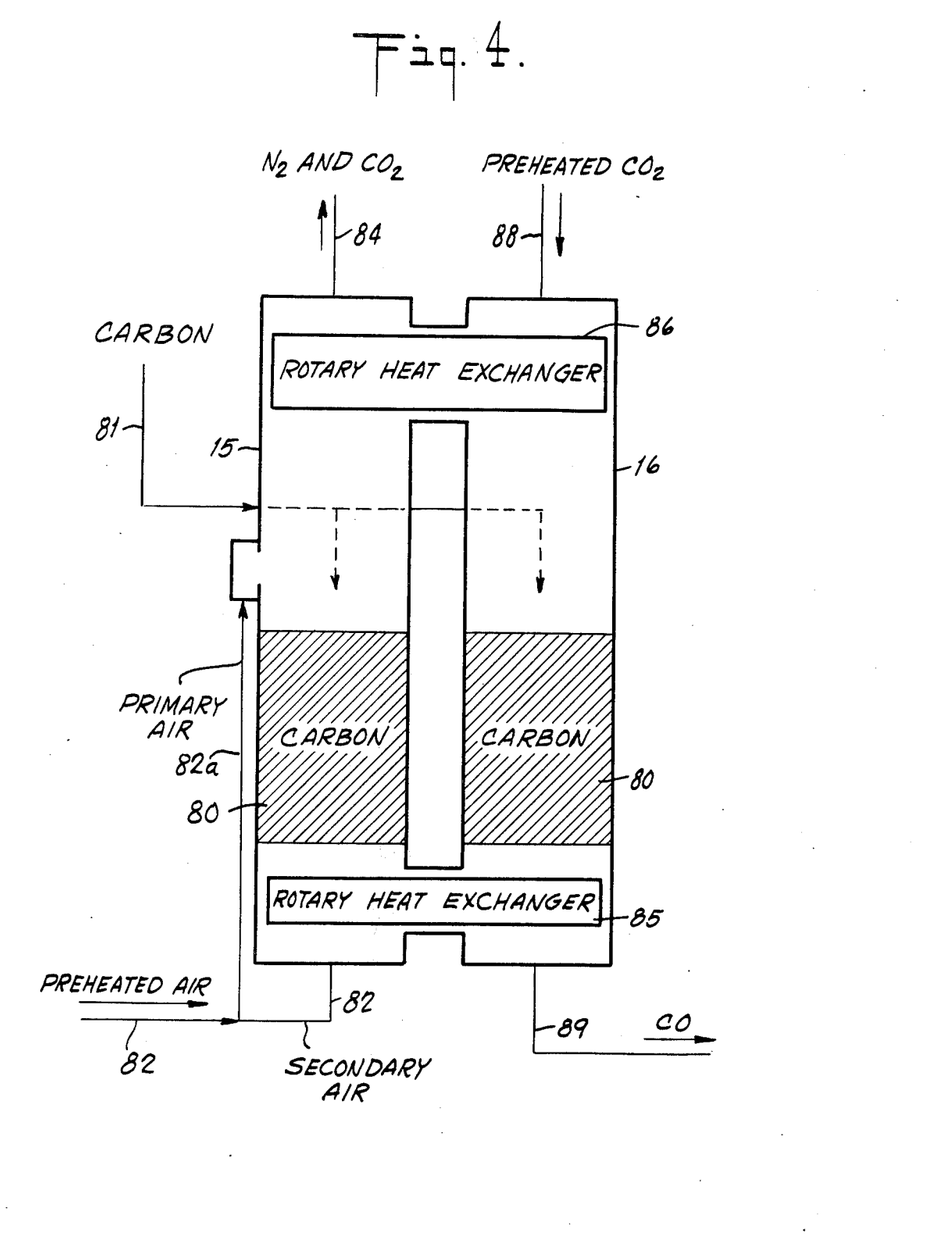
FIG. 4 schematically illustrates a combination reactor comparable to the reactors illustrated in FIG. 2.

Reference is now made to FIG. 4 of the drawings which schematically illustrates a special embodiment of the reactors 15 and 16 of FIGS. 1 and 3 wherein reactors 15 and 16 share a common heat exchanger. As illustrated in FIG. 4, reactors 15 and 16 are provided with a bed of carbon 80 therein, the carbon being supplied via conduit 81.

Reactor 15 is operated in the phase wherein the carbon therein is combusted with air supplied via conduit 82 into the lower portion thereof for the combustion of the carbon to produce a hot combustion gas effluent comprising nitrogen and carbon dioxide which issues from the upper part of reactor 15 via line 84. Primary air is also supplied to reactor 15 via line 82a above the mass or bed 80 of carbon therein to assure complete combustion. In the embodiment illustrated in FIG. 4 the hot air entering the bottom of reactor 15 via line 82 passes through lower rotary heat exchanger 85. Rotary heat exchanger 85 which has been previously heated by the gases issuing from the lower part of reactor 16, to be later described, serves to additionally preheat the air before it comes into contact with mass 80 of carbon within reactor 15. The resulting hot combustion gas effluent just prior to issuing from reactor 15 via line 84 passes through rotary heat exchanger 85 and serves to heat that portion thereof which comes into contact with the hot combustion gases.

While reactor 15 is in the phase wherein the carbon is combusted with air, reactor 16 is operating in the phase wherein the carbon is reacted with carbon dioxide to produce carbon monoxide, as illustrated. In the operation of reactor 16 preheated carbon dioxide is supplied to the upper part of reactor 16 via conduit 88 and enters the top part of reactor 16 and passes through and in contact with upper rotary heat exchanger 86. The portion of rotary heat exchanger 86 which the carbon dioxide supplied to reactor 16 comes into contact for heat exchange has been previously heated by the hot combustion gas effluent issuing from reactor 15 via conduit 84. Upon passing through rotary heat exchanger 86, the resulting hot carbon dioxide comes into contact with bed 80 of carbon or reactor 16 and reacts therewith to produce endothermally carbon monoxide. The resulting produced carbon monoxide then passes through and in contact with rotary heat exchanger 85 serving to heat the same and then issues from the bottom of reactor 16 via conduit 89.

Rotary heat exchangers 85 and 86 in the lower and upper portions of reactors 15 and 16, respectively, serve to improve the heat efficiency of the process in accordance with this invention and avoids the necessity of reversing the roles of reactors 15 and 16. The reaction between carbon and air to produce carbon dioxide and nitrogen is exothermic and the reaction between carbon and carbon dioxide to produce carbon monoxide is a high temperature endothermic reaction. Some of the heat necessary to carry out the high temperature endothermic reaction between carbon and carbon dioxide to produce carbon monoxide is obtained by cooling the hot carbon monoxide gases issuing from the bottom of reactor 16 by means of rotary heat exchanger 85 and using that portion of the heat to preheat the air supplied to the lower portion of reactor 15 via line 82. Similarly, the hot combustion gases before leaving the upper part of reactor 15 via conduit 84 are cooled by heat exchange contact with rotary heat exchanger 86 and the resulting recovered heat then employed by rotary heat exchanger 86 to additionally preheat the carbon dioxide supplied to the upper portion of reactor 16 via conduit 88.

As indicated, rotary heat exchangers 85 and 86 each rotate in a horizontal plane and are of a size such that as rotary heat exchangers 85 and 86 rotate segments thereof move continuously from one reactor to the other reactor and in so doing serve to pick up and/or deliver heat to the gaseous streams in contact therewith. Rotary heat exchangers 85 and 86 are available in various materials, refractory metal and non-metallic or ceramic materials.

Figure 5:
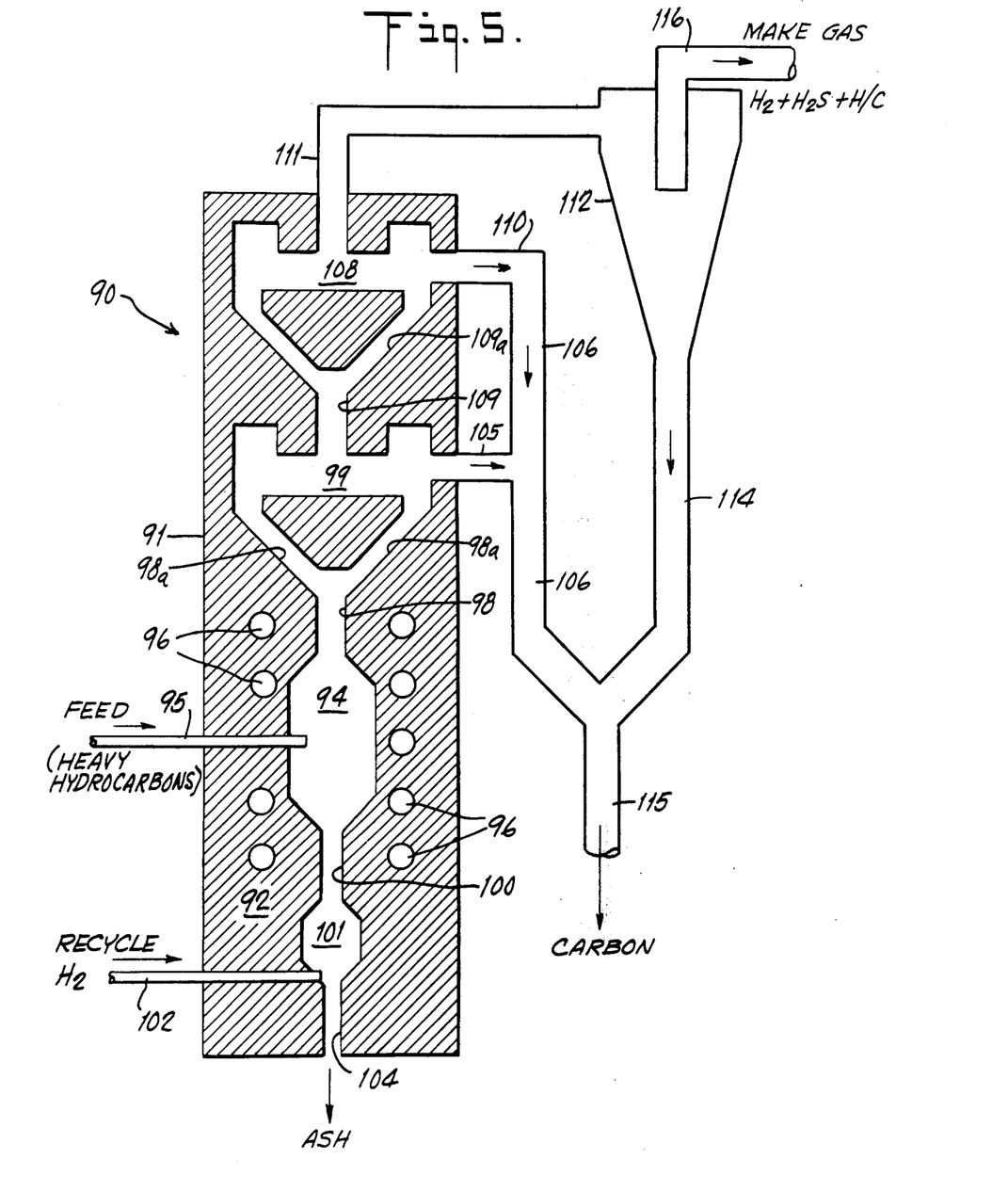
FIG. 5 schematically illustrates a reactor specially adapted for the thermal decomposition or pyrolysis of a hydrocarbonaceous feedstock with the resultant production and separation therefrom of carbon and hydrogen.

Reference is now made to FIG. 5 of the drawings which schematically illustrates a reactor useful in the practices of this invention for the conversion of a hydrocarbonaceous feed into a hydrogen-containing gas stream and a stream of carbon particles. The reactor generally identified by reference numeral 90 comprises a unitary structure, such as a structure made up of a steel shell 91, provided with refractory liner or inner structure 92. The refractory liner or inner structure 92 defines zones and passageways within reactor 90. Zone 94 provided within reactor 90 is supplied with hydrocarbonaceous material, such as a heavy hydrocarbon fraction or residual oil via conduit 95. As the hydrocarbonaceous feed material enters zone 94 it is subjected to thermal decomposition or pyrolysis. The high temperature necessary for effecting thermal decomposition or breakdown or coking of the hydrocarbonaceous material supplied to zone 94 is provided by heating elements 96 provided within refractory structure 92 of reactor 90 positioned in fairly close proximity to zone 94. Heating elements 96 may be electrical or may comprise tubes through which flow a high temperature fluid or gas.

Upon thermal decomposition of the hydrocarbonaceous material supplied to zone 94 there is produced a gaseous or vaporous stream containing hydrogen, vaporous hydrocarbons and finely divided carbon, all of which tend to leave the upper portion of zone 94 via passageways 98 and 98a into velocity reduction or separation zone 99. The heavier materials, such as ash and larger size carbon particles, tend to leave zone 94 via the bottom thereof through passageway 100. Some heavier particle-form carbon tends to drop out of zone 94 via passageway 100 along with the heavier ash components and pass into zone 101. The particle-form carbon which enters zone 101 is separated from the heavier ash constituents or particles by introducing a gas, such as hydrogen, via conduit 102, into the lower portion of zone 101 to strip, entrain and separate the carbon particles from the ash constituents which leave zone 101 via passageway 104. The resulting stripped or separated carbon particles move upwardly via passageway 101 into zone 94 and then via passageways 98 and 98a into separation zone 99 wherein they tend to collect and be separated and removed via passageway 105 for collection via conduit 106.

As illustrated, more than one separation zone 99 may be and is provided within reactor 90. Gas solids separation zone 108 is provided above separation zone 99 and is in communication therewith via passageways 109 and 109a. Gas solids separation zone 108 acts like zone 99 to effect separation of the entrained carbon particles leaving zone 94 via passageway 98. The resulting separated carbon particles leave zone 108 via line 110 for collection and transport via line 106.

Gaseous hydrogen and vaporous hydrocarbons leave the uppermost gas solids collections zone, such as zone 108, via passageway 111 and move into gas-solids separator or cyclone 112 wherein any solid carbon is separated via line 114. The carbon collected and moving within conduits 106 and 114 are combined and recovered via conduit 115. The gaseous hydrogen and vaporized hydrocarbons are recovered from cyclone 112 via conduit 116.

The reactor of the type illustrated in FIG. 5 provides a unitary structure useful not only for the efficient thermal decomposition of a hydrocarbonaceous feed material, such as a residual or heavy fuel oil, but also serves to effect separation therein of the resulting produced gaseous hydrogen, the resulting produced vaporized hydrocarbons, the resulting produced particle-form carbon and the resulting produced solid ash constituents, if an ash-containing hydrocarbonaceous feed is employed. Structure or reactor 90 provides means for the highly efficient utilization of space and heat for the thermal decomposition of the hydrocarbonaceous feed material, as well as providing a highly efficient means for separating gas from solids and solids from solids. Also, the operation of the reactor described in connection with FIG. 5 yields a substantially pure carbon or a carbon which has a low ash content and is substantially free of sulfur.

In the practices of this invention many advantages are obtainable. Hydrogen is produced at a cost competitive with other methods of producing hydrogen, such as by partial oxidation or steam reforming, and from more varied feedstocks. Essentially, in the practices of this invention in one embodiment wherein the carbon is derived from hydrocarbonaceous material, hydrocarbon feed is thermally decomposed into elemental hydrogen and carbon. The carbon is then converted into carbon monoxide, mixed with steam and the resulting reaction mixture shifted into hydrogen and carbon dioxide and the hydrogen separated. The hydrogen thus separated is advantageously added to the hydrogen produced by the thermal decomposition of the hydrocarbon feed.

In accordance with the practices of this invention and assuming the hydrocarbon feed is methane, the overall stoichiometric equation would be:

$$CH_4 + 2H_2O \rightarrow CO_2 + 4H_2 - 75,000 \text{ BTU}.$$

This overall stoichiometric equation is the same as for steam reforming except that it was arrived at by a different route in accordance with this invention. Additionally, since the practices of this invention are not dependent on any particular source of carbon, instead of a hydrocarbonaceous source, a carbonaceous source, such as coke, coal or carbon, might usefully be employed. Further, as pointed out hereinabove, in contrast with partial oxidation a source of substantially pure gaseous oxygen is not necessary since air is adequate and, indeed, is the preferred source of oxygen in the practices of this invention.

Comparing the practices of this invention to steam reforming for the production of hydrogen, steam reforming can use only light hydrocarbons, such as the gaseous hydrocarbons, e.g. methane or naphthas, whereas in the practices of this invention which can be characterized as a carbon shift reaction for the preparation of the hydrogen, light or heavy hydrocarbon or hydrocarbonaceous feeds may be employed. For example, the carbon resulting from the pyrolysis of a hydrocarbonaceous feed could have come from anywhere and the process of the subject invention might be viewed as a process for converting carbon into hydrogen. According to the overall stoichiometric equation, $$C + 2H_2O \rightarrow CO_2 + 2H_2 - 32,180 \text{ BTU}$$

it is calculated that one ton of carbon provides 133 MSCFD of hydrogen with a slight heat deficit. Assuming that 40% of the carbon is consumed in making heat and power and overcoming inefficiencies, the net production of hydrogen would be about 80 MSCFD per ton of carbon. At the present value of hydrogen this amount of hydrogen would provide a value substantially greater than the value of the carbon utilized in its production.

The various separate reactions employed in sequence in the practices of this invention are relatively easily carried out and for the most part well understood. For example, the combustion of carbon with air to produce a combustion gas effluent containing carbon dioxide and nitrogen is well understood. The reaction between carbon dioxide and carbon to produce carbon monoxide is not complicated by the presence of hydrogen or methane or other possibly competing reactants. Likewise, the shift conversion reaction involving the production of hydrogen and carbon dioxide from carbon monoxide and steam, as well as the accompanying separation operations for the separation of nitrogen from carbon dioxide and hydrogen from carbon dioxide are well known and easily carried out.

As indicative of the ease of carrying out the reactions involved in the practices of this invention reference is again made to FIG. 2 thereof of the drawings.

In the operation of the reactors in accordance with this invention, such as reactor 40 of FIG. 2 wherein the reactor is operated in the carbon combustion phase for the production of a combustion gas effluent containing carbon dioxide and nitrogen, the secondary combustion air enters the reactor at a temperature of about 900° F. Upon passage through the checker work therein the secondary combustion air would be further preheated or increased in temperature to well above the ignition temperature of the air and carbon. Depending upon the physical state or origin of the carbon, the ignition temperature of the carbon varies. For example, carbon black prepared in a reducing atmosphere has an ignition temperature of about 977° F., thermal carbon black has an ignition temperature in the range 840°–905° F. Lamp black has and ignition temperature in the range about 666°–684° F. and carbon black derived from natural gas has an ignition temperature in the range 595°–610° F.

The secondary air upon contact with the particle or pellet form carbon within the reactor operated in the carbon combustion phase burns in a rich mixture giving nitrogen plus a mixture of carbon monoxide and carbon dioxide. The preheated primary air entering above the top of the bed of carbon completes the combustion process to yield nitrogen and carbon dioxide and the resulting hot gaseous combustion effluent of nitrogen and carbon dioxide heats the upper checker work as it exits from the reactor at a temperature of about 900° F. The companion reactor, such as reactor 41, operating in the phase wherein carbon is reacted with carbon dioxide to produce carbon monoxide, preheated carbon dioxide enters reactor 41 at a temperature of about 900° F. and is then preheated by the upper checker work to above the reaction temperature of carbon dioxide with carbon to form CO, such as a temperature above 1500° F., desirably in the range 1750°–2500° F. The resulting preheated carbon dioxide passes downwardly in contact with the hot carbon to form carbon monoxide which as it exits from the lower part of reactor 41 heats the lower checker work and leaves reactor 41 at a temperature of about 900° F.

As will be apparent to those skilled in the art in the light of the foregoing disclosure, many modifications, alterations and substitutions are possible in the practice of this invention without departing from the spirit or scope thereof.

I claim:

1. A combination reactor useful for the combustion of carbon with air to produce a combustion gas effluent containing carbon dioxide and nitrogen and useful for reacting carbon dioxide with carbon to produce carbon monoxide comprising in a unitary structure, first and second zones, said first zone being adapted to contain a first bed of particle-form carbonaceous material, first air supply means associated with said first zone for the introduction of air into the lower portion thereof, second air supply means for the introduction of air into said first zone into the upper portion thereof, first means for supplying particle-form carbonaceous material into said first zone into the upper portion thereof to form said first bed of carbonaceous material therein, combustion gas effluent conduit means associated with the upper portion of said first zone for the withdrawal of combustion gas effluent therefrom, said second zone being adapted to contain a second bed of particle-form carbonaceous material therein, carbon dioxide supply means associated with said second zone for the introduction of gaseous carbon dioxide into the upper portion thereof, second means for supplying particle-form carbonaceous material into said second zone into the upper portion thereof to form said second bed of carbonaceous material therein, carbon monoxide-containing reaction gas effluent conduit means associated with the lower portion of said second zone for the withdrawal of carbon monoxide-containing gaseous effluent from said second zone, first and second rotatable heat exchangers associated with said first and second zones, said first rotatable heat exchanger being located in the upper portion of each of said first and second zones for movement therein above said beds of particle-form carbonaceous material therein and above said first and second means for supplying particle-form carbonaceous material to said first and second zones, respectively, and said second rotatable heat exchanger being located in the lower portion of each of said first and second zones for movement therein below said beds of particle-form carbonaceous material therein and above said first air supplying means associated with said first zone for the introduction of air into the lower portion thereof and above said reaction gas effluent conduit means associated with said second zone for the withdrawal of carbon monoxide-containing gaseous effluent therefrom.

* * * * *